(12) United States Patent
Fair et al.

(10) Patent No.: US 10,129,081 B1
(45) Date of Patent: Nov. 13, 2018

(54) DYNAMIC CONFIGURATION OF NPIV VIRTUAL PORTS IN A FIBRE CHANNEL NETWORK

(71) Applicant: EMC IP Holding Company LLC, Hopkinton, MA (US)

(72) Inventors: Robert Fair, Cary, NC (US); Hendrik Tanto, San Jose, CA (US); Shobhan Kumar Chinnam, Cupertino, CA (US); Karunakara Rao Seelam, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 14/673,662

(22) Filed: Mar. 30, 2015

(51) Int. Cl.
*G06F 15/17* (2006.01)
*H04L 12/24* (2006.01)
*G06F 17/30* (2006.01)
*H04L 29/12* (2006.01)

(52) U.S. Cl.
CPC .... *H04L 41/0813* (2013.01); *G06F 17/30067* (2013.01); *H04L 61/6045* (2013.01)

(58) Field of Classification Search
CPC ............. H04L 41/0813; H04L 61/6045; G06F 17/30067
See application file for complete search history.

(56) References Cited

U.S. PATENT DOCUMENTS

| | | | |
|---|---|---|---|
| 6,888,792 B2 | 5/2005 | Gronke | |
| 7,711,789 B1 * | 5/2010 | Jnagal | G06F 3/0605 709/213 |
| 7,782,869 B1 * | 8/2010 | Chitlurinivasa | G06F 9/5011 370/230 |
| 8,077,730 B2 | 12/2011 | Maveli | |
| 8,213,447 B2 | 7/2012 | Hurley | |
| 8,274,881 B2 | 9/2012 | Allen | |
| 8,381,020 B1 * | 2/2013 | Wideman | G06F 11/2092 714/42 |
| 8,626,967 B1 | 1/2014 | Naik | |
| 8,839,043 B1 | 9/2014 | Long | |
| 8,949,656 B1 | 2/2015 | Ninan | |
| 9,298,566 B2 | 3/2016 | LeFevre | |
| 9,390,034 B1 | 7/2016 | Fair | |
| 9,852,034 B2 * | 12/2017 | Akirav | G06F 11/2007 |
| 2002/0129246 A1 | 9/2002 | Blumenau | |
| 2003/0126242 A1 | 7/2003 | Chang | |
| 2004/0199353 A1 | 10/2004 | Bingham | |
| 2005/0102603 A1 | 5/2005 | Tapper | |

(Continued)

*Primary Examiner* — Ario Etienne
(74) *Attorney, Agent, or Firm* — Staniford Tomita LLP

(57) ABSTRACT

Embodiments are described for systems and methods that facilitate dynamic configuration of NPIV virtual ports in a Fiber Channel network environment. SCSI target endpoints are virtualized through NPIV mapping mechanisms. The assignment of many virtual ports to one or more base ports through the NPIV mapping allows data storage systems to be reconfigured dynamically or on-the-fly while the system is up and running. This also allows movement of virtual ports among physical ports, or even among different systems in the network. In a highly available system, such as critical data recovery systems, the ability to migrate data on-the-fly by moving endpoints port-to-port or system-to-system greatly facilitates the ability for data to be maintained and protected in a non-disruptive manner.

20 Claims, 10 Drawing Sheets

(56) References Cited

U.S. PATENT DOCUMENTS

| | | | |
|---|---|---|---|
| 2005/0135351 A1* | 6/2005 | Parmar | H04L 45/742 370/389 |
| 2007/0083625 A1* | 4/2007 | Chamdani | H04Q 3/0045 709/223 |
| 2007/0174851 A1* | 7/2007 | Smart | G06F 3/0605 719/324 |
| 2007/0239944 A1 | 10/2007 | Rupanagunta | |
| 2008/0005311 A1 | 1/2008 | Ali | |
| 2008/0127326 A1* | 5/2008 | Dugan | G06F 9/5077 726/15 |
| 2008/0162813 A1* | 7/2008 | Haustein | G06F 3/0613 711/115 |
| 2009/0254640 A1* | 10/2009 | Otani | G06F 3/0605 709/221 |
| 2009/0307330 A1* | 12/2009 | Allen | G06F 9/45558 709/216 |
| 2009/0307378 A1* | 12/2009 | Allen | H04L 47/10 710/4 |
| 2009/0307388 A1* | 12/2009 | Tchapda | G06F 13/4022 710/33 |
| 2010/0115132 A1* | 5/2010 | Hirata | H04L 12/413 709/245 |
| 2010/0149980 A1 | 6/2010 | Cheung | |
| 2010/0250785 A1* | 9/2010 | Shin | G06F 3/0613 710/3 |
| 2010/0293552 A1* | 11/2010 | Allen | G06F 9/5077 718/105 |
| 2011/0154318 A1* | 6/2011 | Oshins | G06F 9/45537 718/1 |
| 2011/0239014 A1 | 9/2011 | Karnowski | |
| 2011/0239213 A1 | 9/2011 | Aswani | |
| 2011/0302287 A1* | 12/2011 | Muppirala | G06F 9/5077 709/223 |
| 2012/0079499 A1 | 3/2012 | Gold | |
| 2012/0084071 A1* | 4/2012 | Cyr | G06F 11/0793 703/25 |
| 2012/0254554 A1 | 10/2012 | Nakajima | |
| 2013/0198739 A1 | 8/2013 | Razdan | |
| 2013/0246666 A1* | 9/2013 | Vemuri | G06F 3/0622 710/15 |
| 2014/0032727 A1* | 1/2014 | Kano | H04L 67/1097 709/223 |
| 2014/0115277 A1* | 4/2014 | Sakata | G06F 12/00 711/149 |
| 2014/0281715 A1 | 9/2014 | Khan | |
| 2014/0317265 A1 | 10/2014 | James | |
| 2014/0317437 A1* | 10/2014 | LeFevre | G06F 11/2033 714/4.11 |
| 2015/0106518 A1* | 4/2015 | Amann | G06F 9/45558 709/225 |
| 2015/0142945 A1* | 5/2015 | Brandt | H04L 47/623 709/223 |
| 2015/0150000 A1* | 5/2015 | Anumalasetty | G06F 3/06 718/1 |
| 2015/0269039 A1* | 9/2015 | Akirav | G06F 11/2007 714/4.11 |
| 2016/0034366 A1 | 2/2016 | Anglin | |
| 2017/0038991 A1* | 2/2017 | Hillier | G06F 3/0604 |

\* cited by examiner

DYNAMIC CONFIGURATION OF NPIV VIRTUAL PORTS IN A FIBRE CHANNEL NETWORK

TECHNICAL FIELD

Embodiments are generally directed to data storage systems, and more specifically to dynamic configuration of virtual ports in a Fibre Channel network.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computer data storage systems, such as storage area networks (SAN) in enterprise environments often use the Fibre Channel (EC) network technology to provide high-speed (e.g., 2 to 16 gigabit/second) data transfers. A Fibre Channel network comprises a number of ports that are connected together, where a port is any entity that actively communicates over the network (either optical fiber or copper), where a port is usually implemented in a device such as disk storage or a Fibre Channel switch. The Fibre Channel protocol transports SCSI commands over Fibre Channel networks, and network topologies include point-to-point, arbitrated loop (devices in a ring), and switched fabric (devices/loops connected through switches). The Fibre Channel protocol comprises five layers in which a protocol mapping layer (FC4) encapsulates application protocols (i.e., SCSI or IP) into protocol data units (PDUs) for delivery to the physical layers (FC2 to FC0).

The SCSI (Small Computer System Interface) standards used by Fibre Channel networks define certain commands, protocols and electrical/optical interface characteristics for connected devices, such as hard disks, tape drives, and controllers. In data storage networks, a SCSI initiator is typically a computer that initiates a SCSI session by sending a SCSI command, and SCSI target is a data storage device that responds to initiators' commands and provides the required input/output data transfers.

As the needs for large-scale data storage have increased, storage virtualization techniques have been developed improve functionality and allow location independence. Storage virtualization abstracts logical storage (e.g., at the block or file level) from the physical storage devices (e.g., disk arrays). The physical storage resources are aggregated into storage pools to form the logical storage, which presents the logical storage space and transparently maps the logical space to physical storage locations. The Fibre Channel standard includes an N_Port ID Virtualization (NPIV) feature in which multiple Fibre Channel node port (N_Port) IDs can share a single physical N_Port. This allows multiple Fibre Channel initiators to occupy a single physical port, easing hardware requirements in SAN systems. This mechanism allows each virtual server to see only its own storage and no other virtual server's storage. NPIV thus allows a single N_Port to register multiple World Wide Port Names (WWPNs) and N_Port identification numbers. In present systems, Fibre Channel base ports and virtual ports are discretely managed and configured on a one-to-one basis in which a physical port is associated with a single virtual port. This makes reconfiguration and management of these ports relatively difficult in most operating conditions. Furthermore, NPIV ports are directly administered, which adds the disadvantage of increased management complexity and difficulty in performing operations such as storage device failover and migration. As the amount of data in enterprise applications increases, the use of highly-available storage is a key consideration and system requirement. A highly-available storage framework allows transparent storage of the same data across several physically separated machines connected within a SAN or other TCP/IP network. For such systems, it is important that storage devices and data centers are able to be efficiently and quickly reconfigured or replicated in case of failure conditions or even routine maintenance. Reconfiguration and migration tasks in present systems is typically a static operation in which the storage devices and/or entire network is taken down to reconfigure the system or perform large-scale migration of the data. Such as requirement is obviously disruptive to system operation and can cause issues with regard to system performance and integrity.

What is needed therefore, is a way to facilitate a non-disruptive reconfiguration of storage devices in a storage area network, such as by allowing the dynamic configuration of SCSI transport endpoints and NPIV virtual ports in a Fibre Channel network.

What is needed therefore, is a way to transparently virtualize SCSI transport endpoints for management purposes between Fibre Channel base ports and virtual (NPIV) ports.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1A:
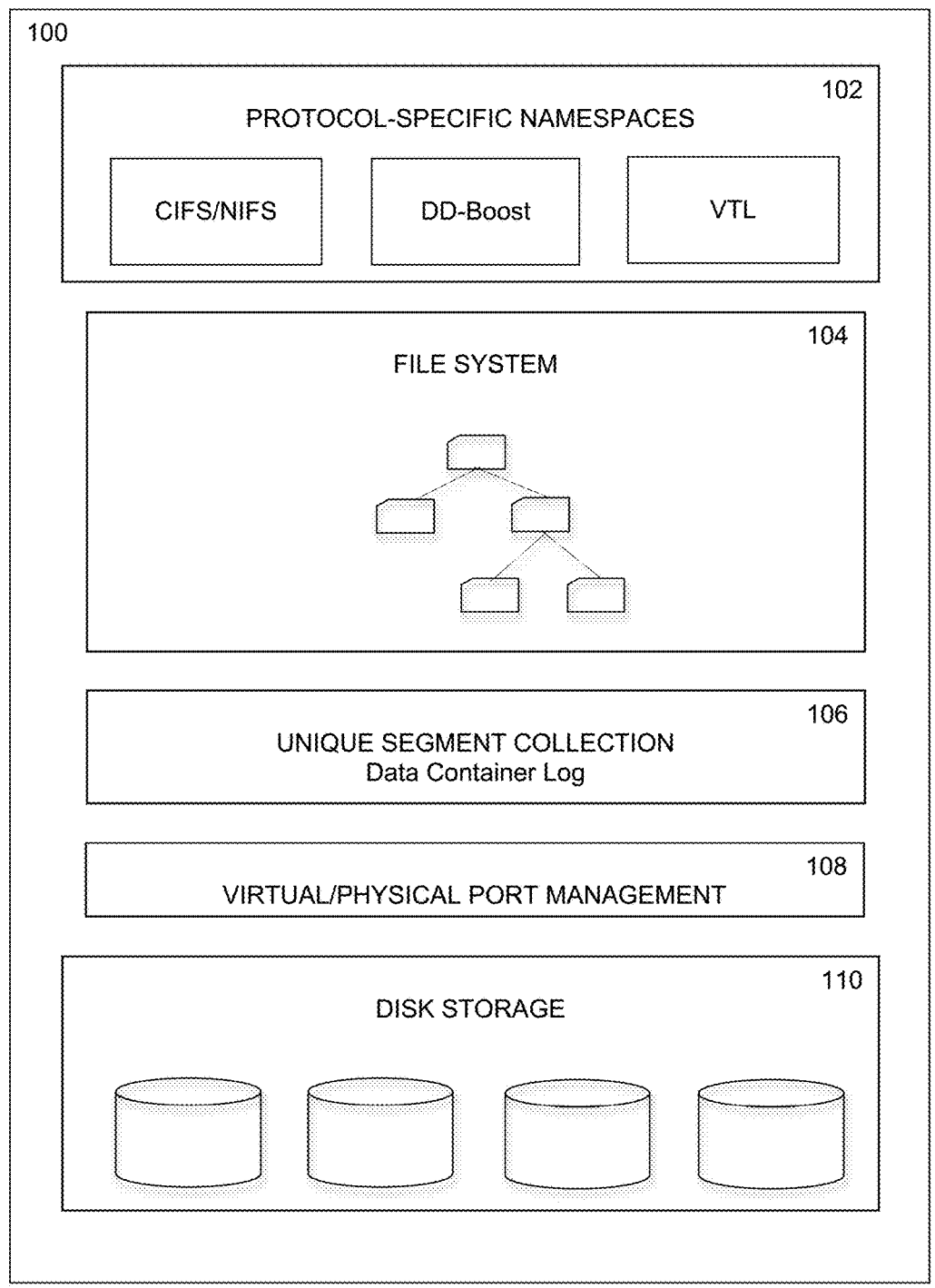
FIG. 1A illustrates logical and physical system layers for a data storage system that implements a system for managing NPIV and non-NPIV Fibre Channel ports, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of simplifying the management of both NPIV and non-NPIV Fibre Channel configurations for SAN and virtual SAN data storage systems. Specifically, embodiments include methods and systems that facilitate on-disruptive reconfiguration of storage devices in a storage area network, such as by allowing the dynamic configuration of SCSI transport endpoints and NPIV virtual ports in Fibre Channel networks. Embodiments may be implemented in a data storage system that performs backup, archiving, and disaster recovery operations with deduplication functionality. Such a system is illustrated by the data domain restorer (DDR) system provided by EMC Corporation, though other similar systems are also possible.

FIG. 1A illustrates logical and physical system layers for a data storage system that implements a system for managing NPIV and non-NPIV Fibre Channel ports, under some embodiments. FIG. 1A illustrates functional layers fir an example large-scale deduplication storage system such as a DDR system. System 100 illustrates the functional layers within a data domain or DDR operating system (DD OS) in which protocol-specific namespaces are presented to clients/applications for accessing a logical file system layer. The files and directories all reference the same pool of unique segments (collections) which is made up of log-structured containers that organize the segments on disk to optimize data throughput and deduplication effectiveness. As shown in FIG. 1A, the protocol-specific namespaces 102 are the external interface to applications and include NFS (network file system) and CIFS (common internet file system) namespaces; as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Files and directories for each namespace are stored in an MTree within the file system 104. With the VTL interface, the virtual tape cartridges are stored as files under special directories MTree snapshots within the DD OS are logical and share the same underlying data segments in the collection. The unique segment layer 106 is a set of files (or virtual tapes) and logical MTree snapshots. The system identifies and eliminates duplicates within each container and then writers compressed deduplicated segments to physical disk. Segments are unique within the collection, and each DDR system has a single collection that is stored as a log of segment locality containers. The collection containers layer over they physical storage devices 110 that may be RAID-enabled disk drive blocks.

For DDR system 100, the Fibre Channel protocol may be employed by one or more of the namespace interfaces, such as the VTL or DD-Boost or VDisk namespaces to direct data to devices within the disk storage subsystem 110 that comprise SCSI targets. Fibre Channel allows target names to be advertised as conventional world wide names (WWPN) or virtual names (NPIV). In an embodiment, the Fibre Channel protocol is modified through enhancements to the SCSI Target subsystem to take advantage of NPIV functionality on the DDR system 100, including endpoint flexibility and failover. Thus, as shown in FIG. 1A, a virtual/physical port management layer or component 108 defines endpoints to represent SCSI targets within the Fibre Channel protocol. Endpoints are neither physical nor virtual, but are abstracted objects having attributes that can be moved around the system, and moved between physical or virtual ports dynamically (i.e., at runtime or "on the fly"). The management layer 108 (referred to either as a "virtual/physical port management layer" or "endpoint management layer") provides a unified input for endpoints representing physical, virtual, or both types of ports depending on the system configuration. Both types of ports (virtual/physical) can be mixed seamlessly for addressing by data sources so that the system administrator does not need to be concerned with whether network traffic is carried over physical or virtual fiber channels. Unlike present known Fibre Channel systems in which a physical port using WWPN is configured with NPIV on top for virtualization, the virtual/physical port management layer provides for unified management for physical ports, virtual ports, or a mix of physical and virtual ports.

Figure 1B:
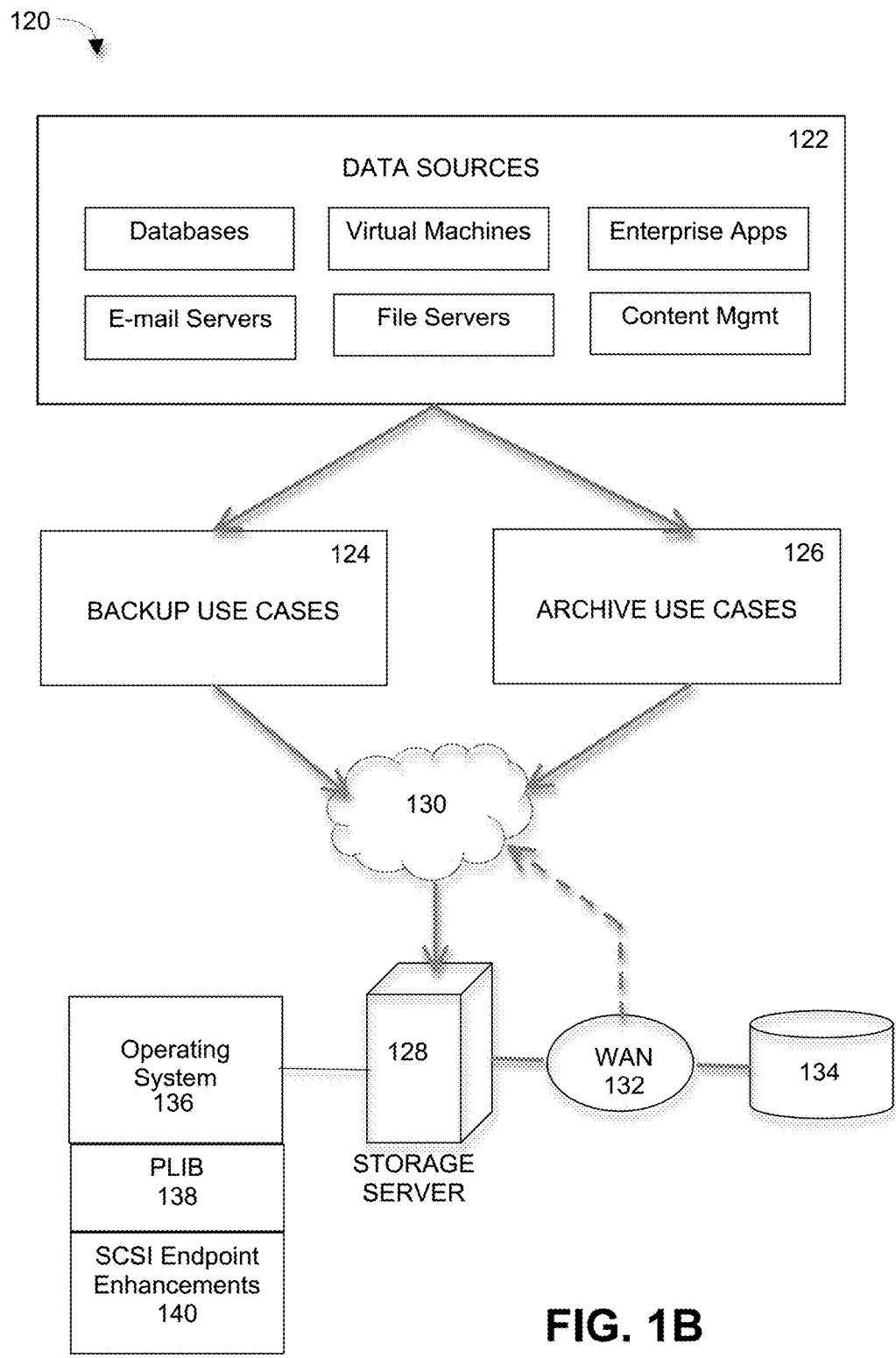
FIG. 1B is a system diagram of a deduplication data storage system implementing the layers of FIG. 1A, and that implements a SCSI endpoint enhancement method, under some embodiments.

FIG. 1B is a system diagram of a deduplication data storage system that implements embodiments of SCSI endpoint enhancement method in accordance with the virtual/physical port management layer of FIG. 1A. In general, an endpoint in the SCSI Target architecture corresponds to a virtual port on the DDR. As shown in diagram 120 of FIG. 1B, data from a number of different data sources 122 is transferred to cloud or networked-based storage devices through a storage server 128. The data is stored through backup 124 and/or archive 126 use cases and the storage server 128 performs deduplication tasks to deduplicate the data during these storage operations to maximize performance and minimize disk storage requirements. In an example implementation, the deduplicated data can be replicated over a WAN (wide area network) 132 to a remote storage site 134 or a service provider site in the cloud 130 for disaster recovery operations, or other similar applications. The storage server computer 128 executes an operating system (OS) 136 that consolidates both backup and archive data on the same infrastructure. For an embodiment in which network 120 represents a DDR-based deduplication storage system, storage server 128 may be implemented as a DDR Deduplication Storage s provided by EMC Corporation. Network 120 may also represent a network system that implements a highly-available storage framework that allows transparent storage of the same data across several physically separated machines connected within a SAN or other TCP/IP network.

In general, the operating system 136 includes an OS kernel and associated target drivers to control the transmission of data to and from the storage devices, such as local storage 134 and/or cloud-based storage accessible through the cloud 130. In an embodiment, the OS kernel target drivers are configured to support NPIV, as defined by the Fibre Channel protocol. To allow user space applications to utilize the NPIV functionality in the kernel, the PLIB 138 is enhanced to support this new functionality. PLIB is a Peripheral Library (PLIB) comprising a simple access library that provides a consistent but very low-level interface to a peripheral on the microcontroller. The PLIB hides register details, making it easier to write drivers that support multiple microcontroller families, and is primarily used to implement device drivers (and some system services) to make them portable.

Figure 2:
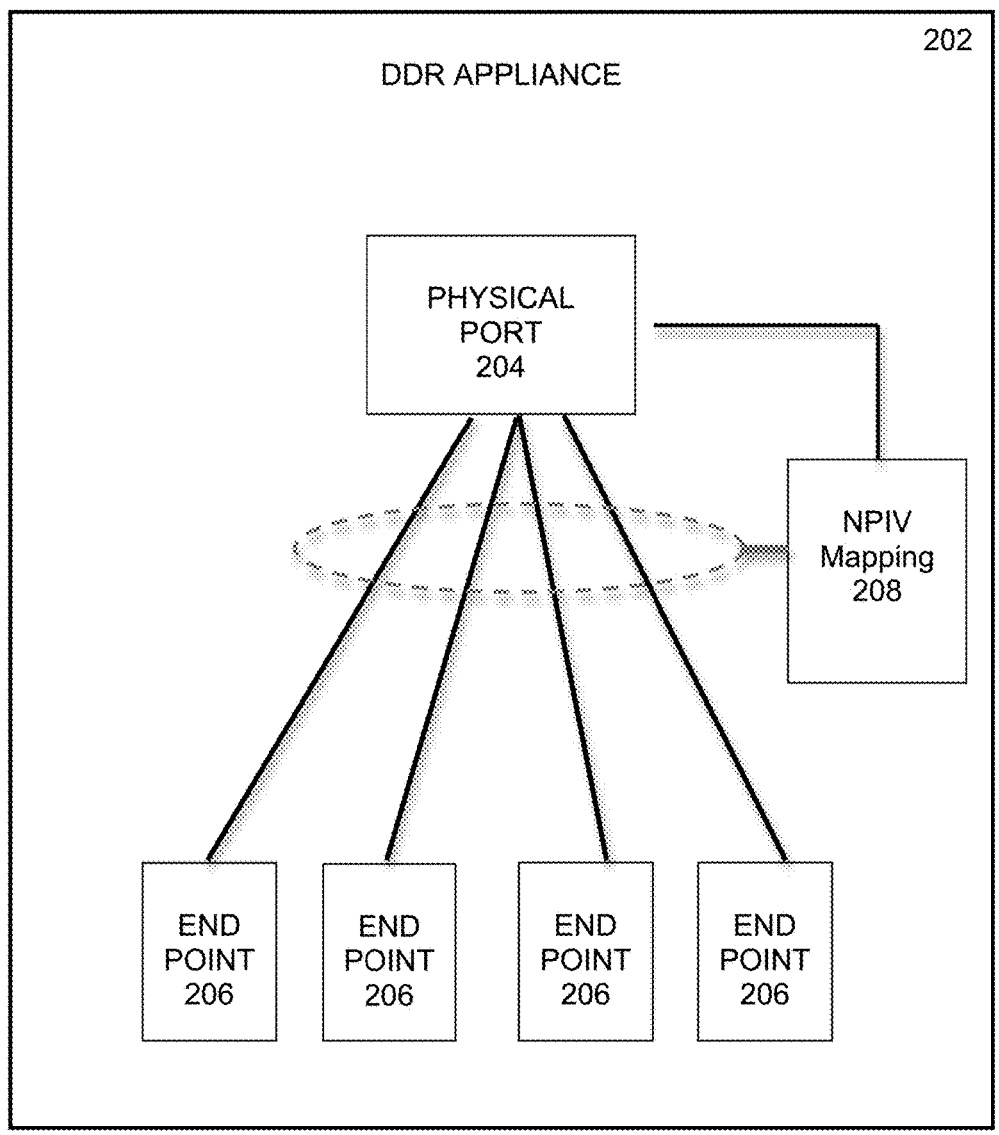
FIG. 2 illustrates an organization of physical ports and associated endpoints within a network device, under some embodiments.

FIG. 2 illustrates an organization of physical ports and associated endpoints within a network device, under some embodiments. In FIG. 2, a physical network device or machine, such as a DDR appliance 202 has at least one physical port 204 which may be embodied as an HBA slot or similar network node. In an embodiment, and NPIV mapping component or function 208 allows multiple endpoints 206 to be assigned or mapped to the single physical port 204. Any practical number of endpoints, such as up to 128 endpoints may be mapped to each physical port 204 on a device 202. In a Fibre Channel system, each endpoint 206 is a named generalization of a transport-specific name in the SCSI target. It is used to expose SCSI target devices based on SCSI target access groups. The endpoint name is unique and may be modified by the user. The NPIV mapping component 208 embodies the NPIV Fibre Channel technology that allows multiple N_Port IDs to share a single physical N_Port. Each N_Port has a unique identity (WWPN) in the network, and an N_Port could be a Host Bus Adapter (HBA) in a server or a target port on a storage array. Physical port 204 may be a base port, which is a port that always exists within a physical port. As shown in FIG. 2, one physical port could have multiple virtual ports 206. When created, each virtual port is assigned a unique WWPN which is used by HBA firmware to perform a login. When port a failover feature is used, a virtual port serves as an endpoint. While a WWPN may be used to name a port in a Fibre Channel network, a WWNN (world wide node name) may be used to name a node in the network.

As opposed to present known Fibre Channel systems in which each physical port 204 is mapped to a single virtual port in a one-to-one relationship, the NPIV mapping component 208 allows the mapping of multiple endpoints (which can be virtual and/or physical) to a single physical port. This means that virtual port management (e.g., port migration, moving ports, removing ports, adding ports, etc.) can be performed on many virtual ports in a unified manner rather than simplistically through the present one-to-one port management procedures. Embodiments thus allow a SAN system to be configured with virtual endpoints that span both base and virtual ports. This is accomplished by adding NPIV features functionality to data domain (or similar) operating systems in order to virtualize transport endpoints between base and virtual ports. This mechanism also significantly impacts the dynamic management and configuration of DD OS based systems. Traditionally, reconfiguration or recovery from failure was a static process requiring taking down a system to reconfigure or repair ports. With the virtualization of SCSI target endpoints through NPIV mapping mechanisms, data storage systems can be reconfigured dynamically or on-the-fly while the system is up and running. This also allows movement of virtual ports among physical ports, or even among different systems in the network. In a highly available system, such as critical data recovery systems, the ability to migrate on the fly by moving endpoints port-to-port or system-to-system greatly facilitates the ability for data to be maintained and protected in a non-disruptive manner. The dynamic configuration/reconfiguration allows for re-mapping of NPIV endpoints among physical ports while backup operations are underway. The configuration/ reconfiguration can occur without disrupting other data transactions or backup operations being executed within the system.

In an embodiment, the NPIV functionality is enhanced to perform endpoint creation on user demand, protocol segregation based endpoint, Fibre Channel port failover, and provide enhanced quality of service. Embodiments include enhancements to the PLIB that support NPIV functionality and that maintain PLIB compatibility with existing PLIB consumers. For purposes of description, certain interface names, programming elements/objects, and programming code segments will be listed and will use conventions as defined by the Fibre Channel protocol and/or in accordance with a specific operating system, such as the Data Domain Operating System (DD OS) provided by EMC Corporation. Adaptation to other operating systems can be performed using techniques known to those of ordinary skill in the art.

NPIV Functionality

Figure 3A:
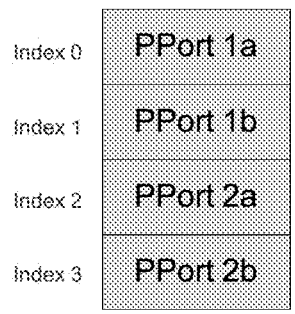
FIG. 3A illustrates an example initial state of a PLIB port table with four physical ports.
Figure 3B:
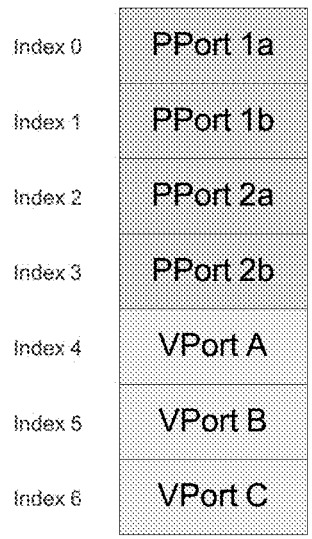
FIG. 3B illustrates the PLIB port table of FIG. 3A with the addition of virtual ports (VPorts)
Figure 3C:
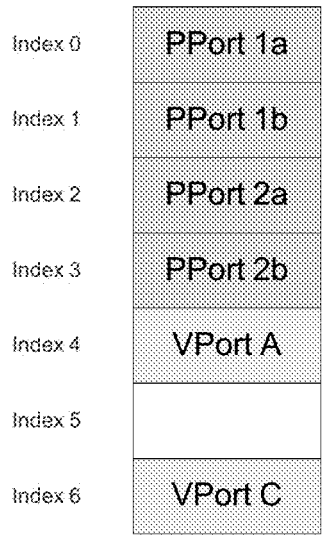
FIG. 3C illustrates the PLIB port table of FIG. 3B with a virtual port deleted.
Figure 3D:
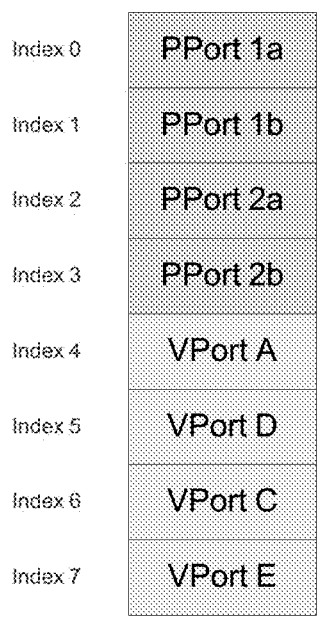
FIG. 3D illustrates the PLIB port table of FIG. 3C with additional virtual ports added

Certain changes are made to the operating system, including the PLIB to accommodate the NPIV feature of Fibre Channel. For example, the size of PLIB port table is extended from 8 to 64, which is defined as DD_PLIB_SCSITGT_PORT_MAX. The size can be extended further to 256 once SCSI Target has support for a 256 bit port bitmask. The port table will now contain both physical ports and virtual ports. PLIB port index is unique across all physical ports and virtual ports. That means a physical port and a virtual port cannot share the same port index. The number of physical ports is static while number of virtual ports is dynamic because virtual port can be created and deleted. The first n entries of PLIB port table are for physical port, where n is the number of physical ports on the system. These entries are fixed and contiguous. The remaining entries in the port table are used for virtual ports. These entries are dynamic and not contiguous. There could be an empty entry in between two filled entries. When a virtual port is created, it will be placed in the first available entry in the port table. When a virtual port is deleted, its entry will be cleared in the port table. FIGS. 3A-3D illustrate changes to the PLIB port table to accommodate NPIV for some example cases, under an embodiment. FIG. 3A illustrates an example initial state of a PLIB port table with four physical ports, denoted ports (PPorts) 1a, 1b, 2a, and 2b, and assigned indexes 0 to 3, respectively. FIG. 3B illustrates the PLIB port table of FIG. 3A with the addition of virtual ports (VPorts) A, B, and C. FIG. 3C illustrates the PLIB port table of FIG. 3B with a virtual port (VPort B) deleted; and FIG. 3D illustrates the PLIB port table of FIG. 3C with additional virtual ports (VPorts D and E) added. As shown in FIG. 3D, VPort D replaces deleted VPort B (at Index 5), and new VPort E is appended as Index 7.

With respect to user interfaces, PLIB interfaces are abstracted within SCSI target (scsitgt) that provides interfaces to the command line (CLI). With respect to programming interfaces, PLIB interfaces that can be used for physical port only are indicated by "pport_idx" in the parameter they take. PLIB interfaces that can be used for virtual port only are indicated by "vport_idx" in the parameter they take. PLIB interfaces that can be used for both physical and virtual ports are indicated by "port_idx" in the parameter they take.

In an embodiment, to support NPIV functionality, several new PLIB interfaces are defined, as described with reference to certain programming examples below. One new interface is the create virtual port interface, which is used to create a virtual port on physical port specified by pport_idx. The virtual port will be created using the WWPN and WWNN passed in the second and third arguments. After created, virtual port will be in disabled state with target mode not set. To use the virtual port, target mode of the virtual port must be first set using dd_plib_scsitgt_set_port_target_mode( ) and the virtual port must then be enabled using dd_plib_scsitgt_set_port_state( ).

```
/**
 * Create virtual port on the specified physical port index
 *
 * @param pport_idx (i) specific physical port index where virtual
port to be
 *                      created
 * @param wwpn      (i) wwpn of virtual port to be created
 * @param wwnn      (i) wwnn of virtual port to be created
 *
 * @return PLIB port index on success or -errno on failure
 */
int dd_plib_scsitgt_create_vport(dd_uint32_t pport_idx, dd_uint64_t
wwpn, dd_uint64_t wwnn)
```

Another new interface is the delete virtual port, which is used to delete a virtual port specified by vport_idx. A virtual port can be deleted in any state and does not need to be disabled first.

```
/**
Delete virtual port specified by the virtual port index
*
* @param vport_idx (i) specific virtual port index to be
   deleted
*
* @return 0 on success or -errno on failure
*/int           dd_plib_scsitgt_delete_vport(dd_uint32_t
vport_idx)
```

A return number interface is used to get the number of virtual ports that are currently present on the system

```
/**
* Return number of SCSITGT virtual ports
*
* @param void
*
* @return Number of SCSITGT virtual ports
*/dd_uint32_t dd_plib_scsitgt_get_num_vports(void)
```

A get_port_info interface is used to get various information (such as PLIB port index, port state, port id, WWPN, WWNN, etc.) of one or multiple virtual ports in one function call. The information is returned in the form of dd_plib_scsitgt_port_info_t structure which is the same structure used in dd_plib_scsitgt_get_port_info( ). At a minimum, the vinfo buffer must have the size for as many number of virtual ports requested in num_requested_vports argument. The vinfo buffer will be filled with as many number of virtual ports requested or as many number of virtual port currently present (at the moment the interface is invoked) whichever is less. It is recommended that dd_plib_scsitgt_get_num_vports( ) be called first to get the number of virtual ports currently present on the system so that the vinfo buffer can be allocated for the number of virtual ports present. The interface will set the num_present_vports parameter to the number of virtual ports present at the time the interface is invoked. If num_present_vports returned is less than num_requested_vports then it means there are fewer numbers of virtual ports present than it is requested and the vinfo buffer only contains as many virtual ports stated in num_present_vports. If num_present_vports returned is greater than num_requested_vports then it means there are more virtual ports present than it is requested and the vinfo buffer only contains as many virtual ports stated in num_requested_vports. If PLIB port index of a virtual port is known, dd_plib_scsitgt_get_port_info( ) can also be used to get port information of virtual port specified by the PLIB port index.

```
/**
 * Get port info w/o lock for as many number of virtual ports
requested or as
 * many number of virtual ports currently present on the system
whichever less
 *
 * @param vinfo              (o) port info buffer with size
enough for
 *                           number of virtual ports requested
 * @param num_requested_vports (i) number of virtual ports requested
 * @param num_present_vports (o) number of virtual ports currently
 *                           present on the system
 *
 * @return 0 on success or -errno on failure
 */
int dd_plib_scsitgt_get_vport_info(dd_plib_scsitgt_port_info_t *vinfo,
dd_uint32_t num_requested_vports, dd_uint32_t *num_present_vports)
```

The following interface is used to get the maximum number of virtual ports that can be created on the system. This is limited by the number of available virtual WWN (world wide names) on the system and the total number of maximum virtual ports supported on each physical port.

```
/**
 * Return maximum number of virtual ports that can be
     created on the
 * DDR system
 *
 * @return maximum number of virtual ports on success
     or -errno on failure
 */int dd_plib_scsitgt_get_max_vports(void)
```

The following interface is used to get the maximum number of virtual ports that can be created on physical port specified by pport_idx. This interface only takes PLIB port index of physical port. If PLIB port index of virtual port is passed, an error will be returned.

```
/**
 * Return maximum number of virtual ports that can be
     created on the specified
   physical port index
 *
 * @param pport_idx (i) specific physical port index
 *
 * @return maximum number of virtual ports on success
     or -errno on failure
 */
   int    dd_plib_scsitgt_pport_get_max_vports(dd_uint32_t
pport_idx)
```

This return number of virtual port interface listed immediately below is used to get the number of virtual ports that are currently present on physical port specified by pport_idx. This interface only takes PLIB port index of physical port. If PLIB port index of virtual port is passed, an error will be returned.

```
/**
   Return number of virtual ports that currently exist on the
     specified
   physical port index
 *
 * @param pport_idx (i) specific physical port index
 *
 * @return number of virtual ports on success or -errno on
     failure
 */int dd_plib_scsitgt_pport_get_num_vports(dd_uint32_t
pport_idx)
```

The get NPIV capability of the switch interface is used to get the NPIV capability of the physical HBA port specified by pport_idx and the switch in which the HBA port is connected to. If NPIV is supported, then DD_PLIB_FC_NPIV_SUPPORTED will be returned in the corresponding capability. Otherwise DD_PLIB_FC_NPIV_NOT_SUPPORTED will be returned. If the link of the HBA port is not online, then the switch's NPIV capability cannot be determined. Therefore DD_PLIB_FC_NPIV_UNKNOWN will be returned in the switch capability. Virtual ports should be created when NPIV is supported on both HBA port and switch.

```
/**
 * Get NPIV capability of the switch and HBA of the specified physical
port
 * index
 *
 * @param pport_idx        (i) specific physical port index
 * @param switch_cap       (o) NPIV switch capability
 * @param hba_cap          (o) NPIV hba capability
 *
 * @return 0 on success or -errno on failure
 */
int dd_plib_scsitgt_pport_get_npiv_cap(dd_uint32_t pport_idx,
dd_plib_fc_npiv_cap_t *switch_cap, dd_plib_fc_npiv_cap_t *hba_cap)
```

The get port state interface listed immediately below is used to get the port state of physical or virtual port specified by port_idx. This interface can take PLIB port index of physical port or virtual port. It is introduced to optimize periodic polling done by the SCSI target which currently uses dd_plib_scsitgt_get_port_info( ) to get mostly port state.

```
/**
 * Get port state for specified port index
 *
 * @param port_idx     (i) specific port index
 * @param port_state   (o) port state
 *
 * @return 0 on success or -errno on failure
 */
int dd_plib_scsitgt_get_port_state(dd_uint32_t port_idx,
dd_plib_fc_port_state_t *port_state)
```

With respect to data structure definitions, a new field parent_port_idx with data type dd_int32_t is added to dd_plib_scsitgt_port_info_t structure. The new field is used to store the physical port index of a virtual port in the PLIB port table. If the port itself is a physical port, the field will be −1 which is defined as DD_PLIB_NO_PARENT.

```
typedef struct dd_plib_scsitgt_port_info {
dd_uint32_t port_idx;
dd_uint32_t virtual_port_idx;
dd_int32_t parent_port_idx;
dd_uint32_t slot;
. . .
dd_uint32_t fcp2_retry;
} dd_glib_scsitgt_port_info_t;
```

The virtual_port_idx field in the above structure is usually of value 0. Now the field will be non-zero if the port is a virtual port. It indicates the port index of a virtual port within its physical port. It is unique within the same physical port but not unique across multiple physical ports. If the port itself is a physical port, its virtual_port_idx field will be 0. virtual_port_idx should not be confused with port index used in PLIB port table. It is assigned by the kernel driver so that it has nothing to do with index within PLIB port table. The use of the count field within dd_plib_table_t of dd_plib_scsitgt_ports is also modified, as follows.

```
typedef struct {
   const uint32_t limit;
   uint32_t count;
   void *const entry;
} dd_plib_table_t;
dd_plib_table_t    dd_plib_scsitgt_ports = {
   DD_PLIB_SCSITGT_PORT_MAX, 0, scsitgt_ports
};
```

The dd_plib_scsitgt_ports. count is used for both physical and virtual port counts. The two least significant bytes are used for physical port count. The two most significant bytes are used for virtual port count. dd_plib_scsitgt_ports. count must not be accessed directly. Instead these two macros: DD_PLIB_SCSITGT_PORT_COUNT and DD_PLIB_SCSITGT_VPORT_COUNT, must be used to access physical and virtual port counts. A new data structure dd_plib_fc_npiv_cap_t is introduced to define NPIV capability of the HBA port and the switch.

```
typedef enum {
DD_PLIB_FC_NPIV_UNKNOWN,
DD_PLIB_FC_NPIV_SUPPORTED,
DD_PLIB_FC_NPIV_NOT_SUPPORTED,
} dd_glib_fc_npiv_cap_t;
```

With respect to threading and locking, all PUB interfaces described above are executed in the caller's context. All accesses to PUB port table (dd_plib_scsitgt_ports) are protected with dd_plib_mutex through a dd_plib_mutex_lock( ) function call.

The following sample code shows how to get the maximum number of virtual ports supported on the system and per physical port.

```
{
   int system_max_vports, pport_max_vports;
   dd_uint32_t num_pports;
   ...
   system_max_vports = dd_plib_scsitgt_get_max_vports( );
   if (system_max_vports < 0) {
      /* Error */
   }
   ...
   num_pports = dd_plib_scsitgt_get_num_ports( );
   for (i = 0; i < num_pports; i++) {
      pport_max_vports =
dd_plib_scsitgt_pport_get_max_vports(i);
      if (pport_max_vports < 0) {
         /* Error */
      }
      ...
   }
}
```

The following sample code shows how to get NPIV capability of the HBA port and the switch before creating a virtual port.

```
{
   dd_plib_fc_npiv_cap_t hba_cap, switch_cap;
   ...
   /* Get NPIV capability of physical port with PLIB port index 0
   and the switch the port is connected to */
   if (dd_plib_scsitgt_pport_get_npiv_cap(0, &switch_cap,
      &hba_cap) < 0) {
      /* Error */
   }
   if ((hba_cap == DD_PLIB_FC_NPIV_SUPPORTED) &&
   (switch_cap == DD_PLIB_FC_NPIV_SUPPORTED)) {
      dd_plib_scsitgt_create_vport(...)
      ...
   }
   ...
}
```

The following sample code shows how to create, operate and delete a virtual port.

```
{
   int plib_vport_idx;
   dd_uint64_t my_wwpn, my_wwnn;
   dd_plib_scsitgt_port_info_t port_info;
   ...
   /* Create a virtual port with WWPN my_wwpn and WWNN
my_wwnn on a physical port with PLIB port index 0 */
   plib_vport_idx = dd_plib_scsitgt_create_vport(0, my_wwpn,
my_wwnn);
   if (plib_vport_idx < 0) {
      /* Error */
   }
   ...
   /* Set the virtual port to target mode */
   if (dd_plib_scsitgt_set_port_target_mode(plib_vport_idx, 1, 0)
< 0) {
      /* Error */
   }
   ...
   /* Enable the virtual port */
   if (dd_plib_scsitgt_set_port_state(plib_vport_idx,
DD_PLIB_FC_PORT_ENABLE) < 0) {
      /* Error */
   }
   ...
   /* Get port info of the virtual port */
   if (dd_plib_scsitgt_get_port_info(plib_vport_idx, &port_info)
< 0) {
      /* Error */
   }
   ...
   /* Delete the virtual port */
   if (dd_plib_scsitgt_delete_vport(plib_vport_idx) < 0) {
      /* Error */
   }
   ...
}
```

The following sample code shows how to get the number of virtual ports currently present on the system and to get_port_info of all the virtual ports.

```
{
   dd_uint32_t num_vports, num_vports_now;
   dd_plib_scsitgt_port_info_t *port_info;
   ...
   num_vports = dd_plib_scsitgt_get_num_vports( );
   if (num_vports > 0) {
      port_info =
dd_malloc((sizeof(dd_plib_scsitgt_port_info_t) * num_vports), . . .);
      if (dd_plib_scsitgt_get_vport_info(port_info,
num_vports, &num_vports_now) < 0) {
         /* Error */
      }
      if (num_ports <num_vports_now) {
      /* There are more virtual ports now than when we queried.
      * port_info contains "num_vports"entries.
      */
      if (num_ports >num_vports_now) {
      /* There are fewer virtual ports now than when we queried.
      * port_info contains "num vports now" entries.
      */
```

```
        ...
      }
    }
  }
}
```

The following sample code to get_port_info of multiple virtual ports is not allowed because virtual port indexes in PLIB port table are not guaranteed to be contiguous (due to VPort delete request that could result in empty entry in the port table).

```
{
    dd_uint32_t num_vports;
    dd_plib_scsitgt_port_info_t port_info;
    ...
    num_vports = dd_plib_scsitgt_get_num_vports( );
    for (i = 0; i <num vports; i++) {
        rc = dd_plib_scsitgt_get_port_info(i, &port_info);
        ...
    }
    ...
}
```

In general, the PLIB does not use any network protocol, and does not store any persistent information to non-volatile storage. In an embodiment, the changes to the PLIB to accommodate NPIV features in Fibre Channel are used to enhance SCSI target endpoint functionality in a DD OS (or similar) data storage system.

SCSI Target Endpoint Enhancements

Embodiments are directed to providing enhancements to the SCSI target subsystem to take advantage of NPIV functionality on data domain restorer (DDR) systems, including endpoint flexibility and failover DD OS kernel drivers have added support for NPIV. This allows new functionality to be added to the overall SCSI target solution, including additional endpoint flexibility and the ability to perform endpoint failover between physical Fibre Channel ports. Certain use cases are identified for this functionality including: (1) simplifying multiple system consolidation, (2) endpoint failure to improve single-node availability, (3) port cost reduction, (4) system management isolation for multi-tenancy, and (5) facilitating migration to DDR from environments accustomed to more target ports.

Figure 4A:
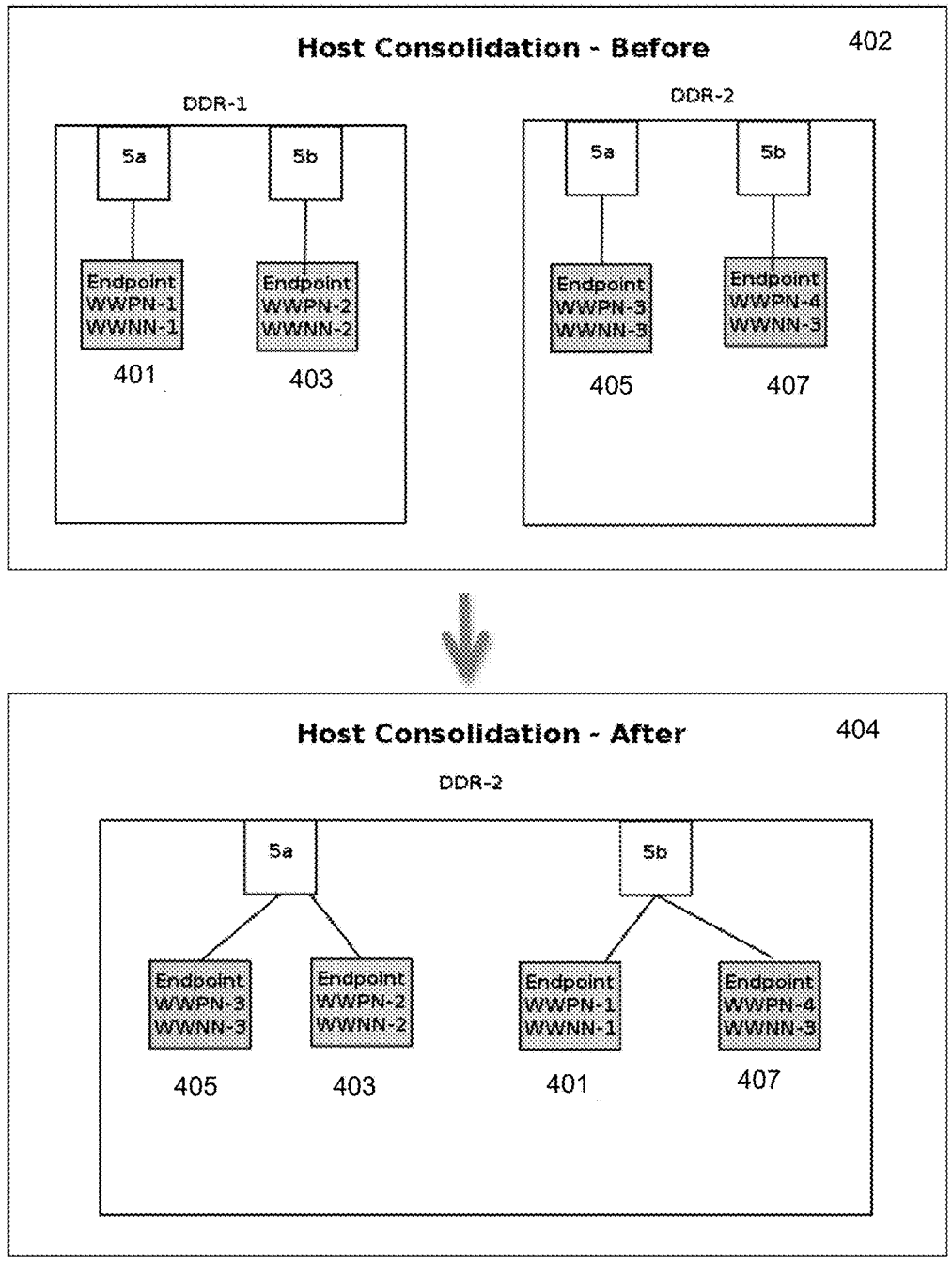
FIG. 4A illustrates an example of host consolidation using a SCSI target endpoint enhancement, under an embodiment.

With respect to system consolidation, multiple data domain restorer systems (DDRs) are consolidated into a single larger DDR, for example to reduce power usage or data-center footprint, or to improve de-duplication. To reduce the need to rezone or reconfigure existing initiators additional endpoints are configured on the consolidated system to provide equivalent access to the old discrete systems. FIG. 4A illustrates an example of host consolidation using a SCSI target endpoint enhancement, under an embodiment. Initially, there are two systems, DDR-1 and DDR-2, each with two Fibre Channel ports each with unique associated endpoints. Physical ports 5a and 5b on DDR-1 are associated with respective endpoints 401 and 403, and physical ports 5a and 5b on DDR-2 are associated with respective endpoints 405 and 407. These are then consolidated onto a single DDR (DDR-2) serving the same set of endpoints and WWPN/WWNN. Thus, as shown in FIG. 4A, DDR-2 has physical port 5a associated with endpoints 405 and 403 and port 5b associated with endpoints 401 and 407.

Figure 4B:
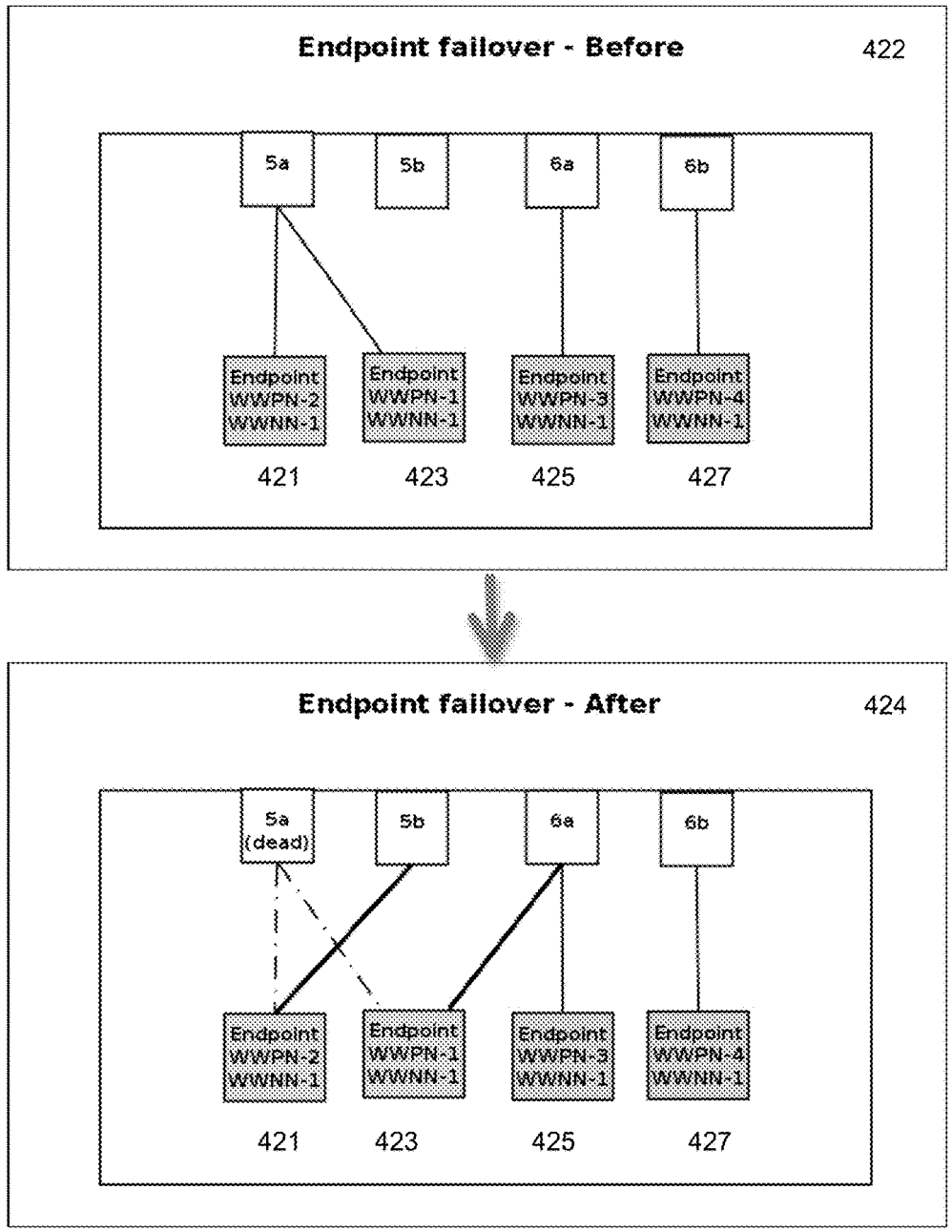
FIG. 4B illustrates an example of a typical endpoint configuration, with endpoints active on several different Fibre Channel interfaces, under an embodiment.

With respect to endpoint failover, endpoints are integrated with port failure/offline detection to failover endpoints to alternate ports in case of failure. This provides additional resilience for single-system DDRs. FIG. 4B illustrates an example of a typical endpoint configuration, with endpoints active on several different Fibre Channel interfaces. Block 422 illustrates an example state of the endpoints prior to failure in which port 5a is associated with ports 421 and 423, port 6a is associated with port 425, and port 6b is associated with port 427. If interface 5a now fails, each endpoint active on that interface may have a different failover destinations, in this case the two endpoint 421 migrates to interface 5b and endpoint 423 migrates to interface 6a and they continue to provide service, as shown in block 424.

With respect to port cost reduction, the use of multiple endpoints with fewer, higher capacity, physical interfaces reduces the cost of a DDR, or similar storage appliance. It also reduces the need for additional slots to be reserved for those interfaces. For example, instead of using 4, 2×8 Gb ports in a DDR 2, 2×16 Gb ports can be used, with eight endpoints assigned to the interfaces. This provides the same aggregate bandwidth and connectivity, yet reduces the system cost and slot usage.

With respect to system management isolation and multi-tenancy, multiple endpoints are used to isolate and compartmentalize access to a DDR (or other SAN) system from a management and access perspective. Consider an SMT (multi-tenant) system where it is desirable to allow tenants to manage aspects of their DDR SCSI Target access, but not interfere with other tenants. In this case the landlord could provision one or more endpoints for a tenant, then give the tenant the ability to configure the groups, devices and LUNs for that endpoint (this assumes the SCSI Target service allows corresponding separation for management). Note that multiple endpoints are a building block in the complete SMT solution for a SAN. Additional functionality would include (but not be limited to): allowing delegation of access groups to tenants, allowing delegation of device creation/deletion to tenants, and allowing delegation of SCSI Target service-specific features to tenants, for example create/delete of VTL tapes and importing/export VTL tapes from a tenant-specific tape pool to a tenant-specific VTL.

Figure 5A:
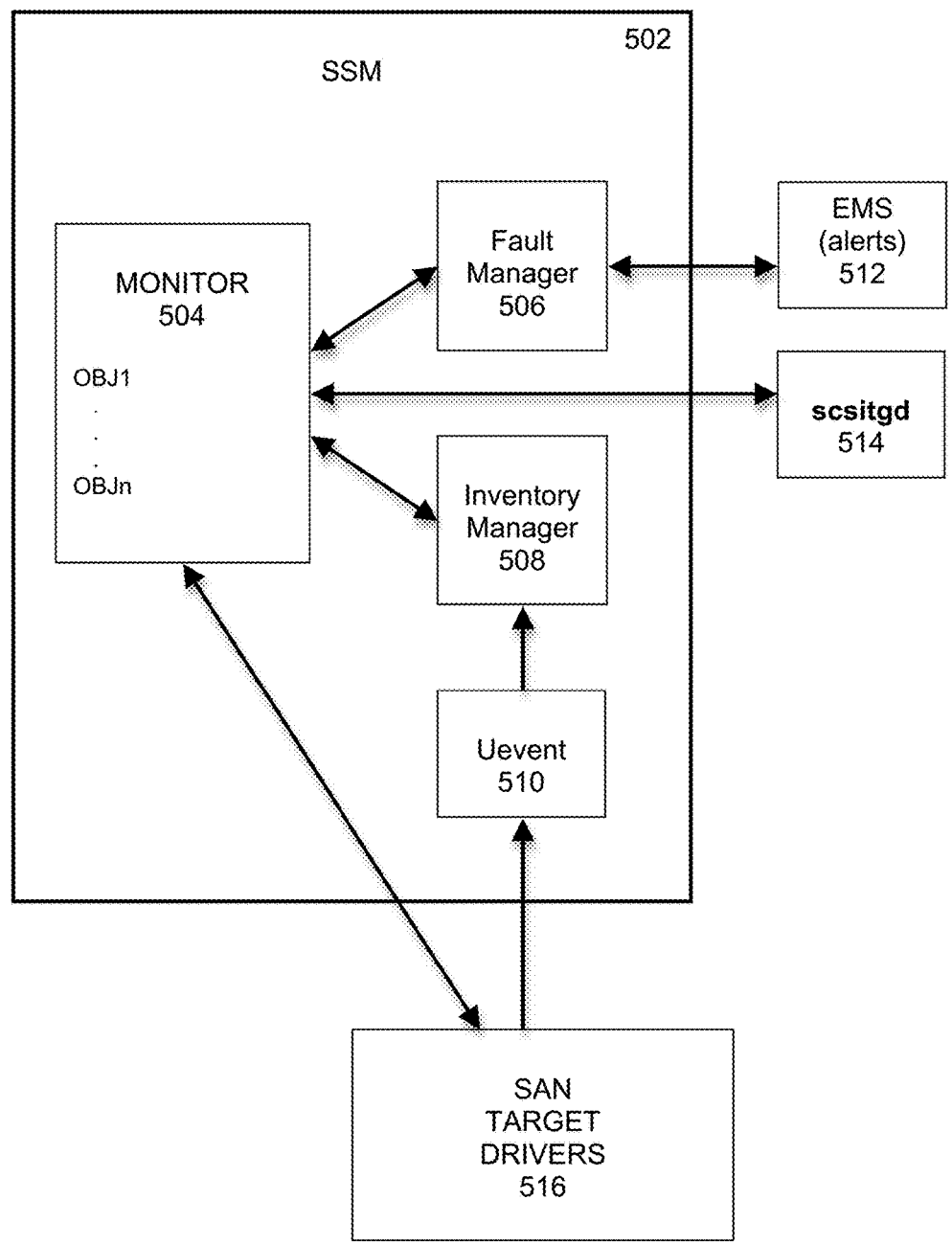
FIG. 5A illustrates a Fibre Channel Storage Subsystem Manager (SSM) configured to monitor target ports for failures, under some embodiments.

Embodiments also facilitate migration to the DDR environment from environments used to more target ports. DDR systems traditionally have a relatively low Fibre Channel port count when compared to comparable systems. By using multiple endpoints it becomes easier for new customers to migrate from environments where higher port counts are common. For example a system previously configured with 12 Fibre Channel ports may be configured with a DDR using 12 endpoints and a smaller number of physical interfaces. Embodiments support multiple SCSI Target endpoints on SCSI Target ports. That is, there may be a M:1 relationship between endpoints and ports. Endpoints can be added, deleted or migrated between ports as needed, either under administrator control or under direction of the single-node endpoint failover functionality. For the Fibre Channel transport this is supported on all topologies where NPIV is supported. For non-NPIV environments, scsitgtd continues to operate as previously, with a 1:1 relationship between an endpoint and its associated system address. The scsitgtd is a multi-threaded SCSI target daemon process that interfaces with the SSM monitor subsystem. As a daemon process, scsitgtd runs as a background task and not under direct control of a user interactive process. It comprises a management process that orchestrates the main functionality of the virtual/physical port management process 108, and sends commands to the operating system kernel to create NPIV ports as well as relevant configuration information. The scsitgtd also waits for critical or defined events related to failover/migration, or other events and then sends messages related to these events through the SSM monitor, as shown in FIG. 5A, described in greater detail below.

Under an embodiment, scsitgtd is enhanced as follows: (1) to support NPIV and non-NPIV (backwards compatible) modes; (2) to remove the current implicit 1:1 relationship between endpoints and transport system address; (3) enhance the scsitgtd transport subsystem to allow virtual port support; (4) enhance the scsitgtd Fibre Channel transport subsystem in use the new NPIV functionality supported by the kernel drivers (5) to detect and coordinate endpoint failover and failback when port failure occurs; (6) enhance the dd_scsitgtc API to allow utilization of the enhanced functionality; (7) enhance the SMS functionality and API to allow utilization of the enhanced functionality; and (8) enhance the DDR CLI functionality to allow utilization of the enhanced functionality.

Figure 4C:
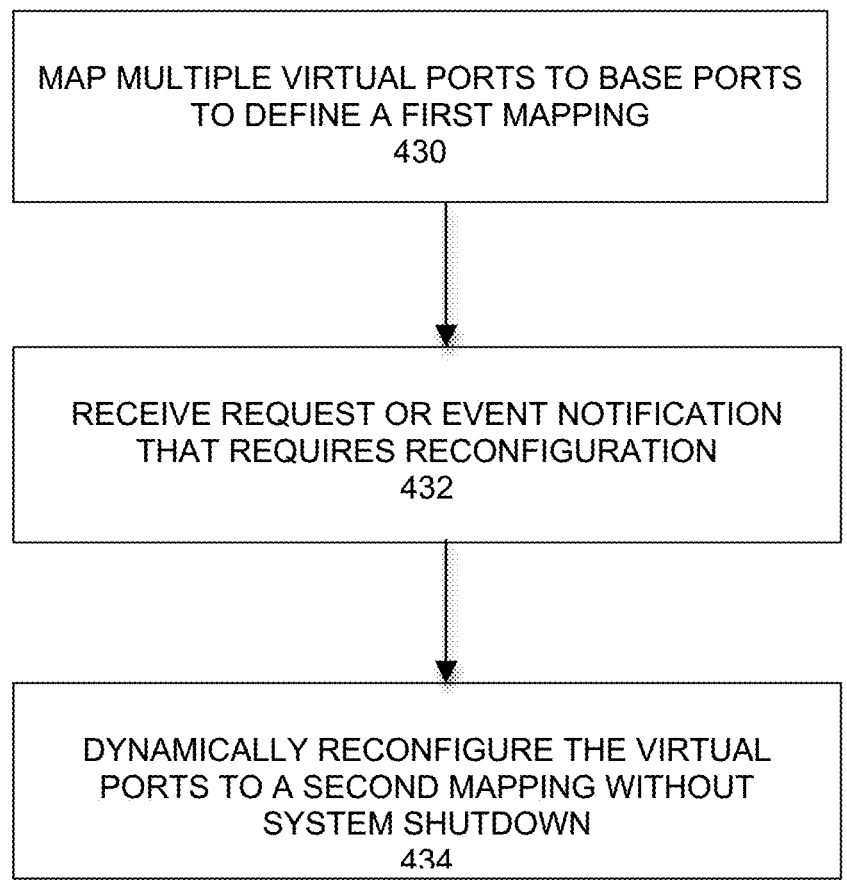
FIG. 4C is a flowchart that illustrates a method of performing dynamic reconfiguration of NPIV virtual ports in a Fibre Channel network, under some embodiments.

The endpoint mapping and scsitgtd SCSI target daemon process also facilitates the dynamic configuration of virtual ports within a storage system network to allow for non-disruptive migration of data or system reconfiguration. FIG. 4C is a flowchart that illustrates a method of performing dynamic reconfiguration of NPIV virtual ports in a Fibre Channel network, under some embodiments. In general, FIG. 4C illustrates a method of dynamically configuring NPIV virtual ports in a Fibre Channel SAN environment, coordinated with a user-space management daemon that performs NPIV to virtual endpoint mapping depending on events such as migration, failover and configuration in block 430, the process maps a plurality of virtual ports to a single physical port (base port) to define a first mapping or configuration of NPIV virtual ports in the SAN. The system may then receiving a request or event notification that requires reconfiguration of the NPIV virtual ports with respect to assignment of these ports to specific base ports, block 432. The system then dynamically reconfigures the virtual ports from the first mapping to a second mapping by assigning the virtual ports to different base ports. The dynamic aspect means that reconfiguration is performed "on-the-fly" such as during runtime of data storage operations, and does not require shutdown of the system, as is done in the case of static reconfiguration. Furthermore, reconfiguration does not disrupt other operations of the system, such as any data transfer or backup operations that might be occurring concurrently. The request or event that caused the reconfiguration may be a data migration operation among devices in the storage system; a failover from a first data storage device to a second data storage device; a failback from the second storage device to the first storage device, or any other critical event that necessitates the transfer of data within or from the system. The data migration may be performed between two transport ports in a device of the storage system or between two storage subsystems each containing one or more storage devices of the storage system.

SCSI Target Port Definition

In general, a system-specific name used to identify a specific SCSI target transport interface. For the Fibre Channel transport the system address is the name of the HBA port used, e.g. 5a. The transport port is a base SCSI target component used to interact with transports. Each interface is identified by a system address. In general, each SCSI Target endpoint has a system address that identifies the transport layer entity used, for example with the Fibre Channel transport the system address refers to the Fibre Channel physical HBA/port, e.g. "5a", and for the iSCSI transport the system address refers to the iSCSI portal. This simple model is appropriate when there is a 1:1 relationship between endpoints and the underlying transport entity. Embodiments of the enhanced SCSI target endpoint system relax the 1:1 relationship and allows more operations and attributes to be associated with the underlying transport entity, which currently does not have a clear definition. Expanding the term "system address" to refer to the entire underlying transport entity was considered, however this leads to some awkward usage. For example, setting the topology for a system address is unnatural, it is not the system address that is having its topology set, it is the underlying transport entity. To clarify the description, the term SCSI Target "transport port," or more simply just "port," is defined as the transport entity that endpoints associate with. Each port has a unique name, its system address, and the system address continues to be used as currently. For example, a port may have system address 5a. This interface has attributes, such as topology or link speed, depending upon the transport in use. Additionally, endpoints can be assigned to the interface using the system address 5a.

In an embodiment, the SCSI target Fibre Channel transport can be configured in either NPIV or non-NPIV mode. Non-NPIV mode may be equivalent to many systems' current functionality. It is intended for use in environments where NPIV is either not available or causes issues with the customer SAN. When NPIV is disabled only a single endpoint is allowed per transport system address, and the Fibre Channel base port is used to configure that endpoint to the SAN. Endpoint failover is disabled. Preferred embodiments may operate in NPIV, which allows multiple endpoints per interface, each using an NPIV port. In this case the Fibre Channel base port is used as a place-holder definition for the port and is not associated with an endpoint. A single global setting to enable NPIV support provides the simplest configuration for the customer. In addition, to meet the requirement for concurrent mixed-mode NPIV and non-NPIV operation, each port maintains its own value for NPIV enabled/disabled. This follows the global NPIV value by default, but may be disabled for specific interfaces if necessary by the administrator. For example, if a customer is using NPIV for most interfaces but wishes to use 5a with a legacy switch that does not support NPIV then the appropriate CLI configuration would be:

// Enable NPIV globally
ddsh# scsitarget transport option set npiv enabled
// Override the global value and disable NPIV for interface 5a:
ddsh# scsitarget interface modify 5a npiv disabled The npiv enabled option controls whether NPIV functionality can be used by the DDR, for example creating NPIV VPorts in a Fibre Channel SAN. Note: the low-level Fibre Channel subsystem always negotiates the underlying NPIV level in its standard Fibre Channel protocol negotiation. This behavior is unchanged from previous DDOS releases and is not controlled by this option. A system administrator may be responsible for setting the appropriate value for NPIV, or automatic runtime configuration of NPIV-compatible state may be provided.

The properties of a Fibre Channel interface base port change depending on whether or not NPIV mode is enabled, as outlined above. When NPIV mode is disabled the interface base port is configured as today, using the properties provides by the (single) endpoint along with any global properties for the port. For example, the WWPN for the base port is set to that of the endpoint, and the topology is set from the global interface information. When NPIV mode is enabled the interface base port is configured using a transport-specific set of properties derived from default values.

For example, the desired default WWPN is associated with the "third WWPN default", as described in the architecture specification. These values are maintained persistently to allow consistent switching between NPIV and non-NPIV mode, and may also be changed by system administrators, if necessary. For non-HA systems the base port can be set to not register an address with the switch. This is similar to EDL operation, and reduces potential confusion when a WWPN is visible through the SAN but cannot be used for I/O. Note that for HA systems the base port is envisioned as being used as a "ping" port between two nodes of a failover pair, so must still be registered with the switch.

Embodiments allow the configuration and use of multiple endpoints per port. In present systems, scsitgtd discovers ports and automatically creates a single endpoint for each transport port. If a system address is removed, such as by removal of a SLIC, an endpoint can modified to use a different system address, or deleted entirely. The current implicit 1:1 relationship between endpoint and interface leads to most endpoint and transport level management being performed through the endpoint abstraction. With the ability to define multiple endpoints per interface, and the ability to more dynamically assign endpoints to different system addresses, certain enhanced functionality is provided, namely: (1) the ability to add new endpoints, with a given system address and other properties, is defined; (2) properties of endpoints and the properties associated with transport interfaces are clarified and updated as necessary (for example, a Fibre Channel port topology is a property of the port, not an endpoint, as such storage and management of the topology must move from the endpoint to the transport layer); (3) statistics and other monitoring is more clearly defined between the endpoint and each port (i.e., enable and disable of endpoints and ports is clarified and made discrete);

Embodiments also allow for multiple port instance support in scsitgtd transport layer. In present systems, the scsitgtd transport subsystem uses the concept of an abstract port. Each port is uniquely identified by a transport port id, or tpid (an integer value), along with attributes such as it's system address, its online status, as well as transport-specific attributes. Examples of transport-specific attributes include the link speed and firmware version for the Fibre Channel transport. The transport subsystem also associates host initiators (if any) with each transport port. It should be noted that transport ports are referred to as "interfaces." This reduces confusion with the term "port." With support for NPIV, the Fibre Channel transport port abstraction is changed because some attributes are appropriate associated with the physical port (e.g., firmware version, physical presence, link speed, etc.) whereas other attributes are associated with virtual ports (e.g., host initiators, WWPN, WWNN, fcp2-retry state). Note that if NPIV is disabled or not otherwise available then the default behavior is backwards-compatible, i.e., a single port is used. To support multiple instances of a physical port, the concept of multiple port instances is used. New instances of a port may be created, up to a system-defined limit. Each instance has a unique tpid, but has the same system address. In this case, each transport port always has an implicit base port instance. When an endpoint is associated with system address if the address allows multiple instances then the transport layer is called to request a new port instance, which returns a new tpid. This is then persistently associated with the instance until the endpoint is otherwise updated or deleted. The transport layer persistently records each port instance in the registry; this is an extension of the existing transport registry information, which describes each physical port. Transport port APIs are modified to allow the association between base port and its instances to be determined, as well as perform operations such as get statistics on a base port or port instance.

SCSI Target Endpoint Failover/Failback

Embodiments include mechanisms for managing endpoint failover/failback. Endpoints can be configured to perform failover, and optionally failback, when events associated with the underlying port occur. For example, if the port for an endpoint goes offline for an extended period the endpoint may be automatically failed over to a different, functioning, port by the system. This functionality is supported for Fibre Channel ports using NPIV through a storage subsystem manager (SSM) component, and other components or functional structures and elements. In an embodiment, the SSM monitors the target Fibre Channel port (e.g., HBA) for offline/online status, failure conditions, and/or marginal operation. When thresholds for offline/online, marginal or failure conditions are exceeded, it automatically sends alerts, and when it determines and identifies a port to be failed, it disables that port. Alerts are automatically cleared once the fault condition is cleared. A user-level interface may be provided via the OS or an alert subsystem to pass alerts and messages to the user.

FIG. 5A illustrates a Fibre Channel Storage Subsystem Manager (SSM) configured to monitor target ports for failures, under some embodiments. As shown in FIG. 5, SSM 502 includes a monitor 504 that tracks a number of objects (OBJ1 to OBJn) that are maintained by an inventory manager 508. Fault conditions are reported to a fault manager 506 that communicates with an EMS process 512 to transmit the appropriate alerts. In an embodiment, the SSM resides in the user-level layer and communicates with SAN target drivers 516 in the kernel layer through system functions and through a Uevent process 510 which receives Netlink-Socket (datagrams) from the drivers 516.

The primary function of SSM 502 is to monitor the target virtual or physical port for offline, failures or marginal conditions. Alerts are sent for failed and marginal ports through the EMS process 512. When a failed port is identified, that port is disabled by the FC target driver 516 and a notification is sent to scsitgtd 514. SSM 502 will also detect and send an alert when the Fibre Channel target HBA dumps its core. A firmware dump is considered a marginal condition and the port operational state would be set to marginal when this happens. Upon reboot, reloading of the FC target drivers, or when a failed port is enabled by a user space program, the port will resume the state prior to the failure detection. If the failure still exists, then the port operational status will change to failed and that port will be disabled. The SSM 502 will then reconcile the failure with existing alerts, only sending an alert if the failure is a new failure. If the failure is resolved, then the alert will be cleared. SSM 502 will also assume the port monitoring functions for port offline/online oscillations and conditions where an enabled port going offline triggers an alert. In an embodiment, the main functionalities managed or monitored by SSM 502 are: (1) hardware operational status (functional, marginal, failed, missing); (2) firmware dump status; (3) port oscillations and offline/online events; (4) detailed information relating to a port failure or marginal condition; and (5) alert settings and thresholds, though others are also possible.

As shown in FIG. 5A, the SSM 502 interfaces with the Fibre Channel HBA target driver stack 516 through netlink via SSM to obtain data and send alerts when required. The SSM 502 fault detection mechanisms reside within the target driver stack 516. An object (OBJ) in the monitor interfaces with the SSM fault manager 506 to reconcile, send, and clear alerts. The object may be a thread or could be a simple function callback that is spawned/executed once the existence of /sys/class/fc_host object is created. The object sends the settings to the SAN target driver. SSM 502 monitors via netlink the SAN target driver and forwards appropriate events and/or changes to the SSM object. When a failed port is encountered, an alert will be sent to the user via SSM Fault Manager. Upon port failure, that port will be disabled and scsitgtd will be notified. Upon reboot, reloading of the FC target drivers, or when a failed port is enabled by scsitgtd, the port will resume the state prior to the failure detection. For example, if a port was enabled and subsequently that port is detected as failed, that port is disabled. If the system reboots, the failed port will resume an enabled state once the drivers are loaded. If the failure condition was not resolved while the system was down for reboot, the failure condition will once again be detected, the port disabled, and scsitgtd is notified. SSM 502 can detect when a failure condition is resolved and then automatically clear the associated alert. Certain operational parameters for SSM 502 operation can be defined. For example, SSM 502 will monitor all FC ports that are enabled. If an enabled port is offline for more than five minutes, an alert will be sent. Once that port is disabled or comes back online, the alert will be cleared. Port oscillations are also monitored with messages logged or alerts sent based on settings, such as to log a message when a port oscillation occurs. If an HBA is removed and there is an outstanding alert, the outstanding alert(s) will be cleared and the port operational status set to "missing". The scsitgtd daemon maintains the port state (enabled or disabled) and is to be notified of port state changes.

In an embodiment, endpoint failover using the SST monitor may be automatically enabled on ports that support it (e.g., for Fibre Channel ports with NPIV correctly enabled.) Additionally, only those endpoints with a secondary system address are candidates for failover. Each endpoint has a primary (home) system address, and each endpoint has zero or more secondary (alternate) system addresses. Each endpoint may have a current (active) system address. The active system address may be the primary system address, a secondary system address or none if an endpoint is not currently mapped to a valid system address. On failure of a port, any endpoints that use the port as their current system address are candidates to failover to an alternate system address. Endpoints may be failed back to use their home system address when the underlying issue is resolved. The active, primary and secondary system addresses for each endpoint can be changed under administrative control. From a system perspective, scsitgtd receives notifications from the FC-SSM port monitor when Fibre Channel port related events occur, for example a port becoming online or offline, or changing its operational state. Events are immediately sent to scsitgtd, unlike the delay that is introduced for alerts raised by the Fibre Channel SSM. The SSM monitors the state of Fibre Channel ports and provides notifications to scsigtd of changes in state of ports.

For failover detection, scsitgtd performs failover processing based on event notifications from FC-SSM. Table 1 lists certain events that trigger failover, and whether such a failover is delayed or immediate.

TABLE 1

| EVENT | DELAY OR IMMEDIATE FAILOVER |
|---|---|
| Offline Port | Delay |
| Failed Port | Immediate |
| Administrative Endpoint Failure | Immediate |
| Failover on Port Disable | Immediate |
| Failover Requested | |

When an event is received from FC-SSM failover event, scsitgtd looks for endpoints currently associated with the port and queues endpoint failover events for subsequent processing. For a manual failover the administrator causes an immediate failover event to be queued for specified endpoints. Failover events may be immediate or delayed, as indicated in Table 1. A delayed failover waits a given timeout before performing the failover. The delay allows for a transient outage to be resolved without triggering failover. The timeout is an administrator configured option. For the case of delayed failover it is possible for the port state to change a second time before failover has occurred. For example, the port becomes online again. When scsitgtd receives such a notification from FC-SSM it will find and cancel any pending endpoint failovers for that port. For a manual failover the administrator may wait for completion of the operation.

Endpoint failover is executed by an independent agent in scsitgtd. This allows it to gather the appropriate resources to change the configuration. Note that performing failover may take significant time so it is not appropriate to perform it in the context of the FC-SSM notification; so the system is configured such that notifications are relatively lightweight. The execution agent runs both periodically, and also on demand if an immediate failover event occurs. The agent is responsible for handling queued endpoint failover events and executing them. During failover execution each endpoint that meets the criteria for failover is migrated to an alternate system address. The following general algorithm is used:

If endpoint should failover at this
    time then
    Find a new system address for the
    endpoint If new system address can be
    found
    then
        Disassociate endpoint from current system address instance Associate endpoint with failover system address instance Update group device entries for port bitmasks
    end
    end
    if error
    Leave endpoint unchanged, remove failover flag
    else
    Update current endpoint configuration
    End
    Advise waiters of execution completion.

If failover is not possible the endpoint is left alone. This fits the general architectural goal where the system fails over when possible, but acknowledges that at a given point in time failover may not be possible. The new system address may include any of the system addresses associated with the endpoint that are enabled and online. This is discussed in more detail in the description below.

Part of failover processing determines the failover destination. In an embodiment, the system performs the following to determine the failover destination.

1. If the current address is the primary address search each address in the secondary address list for an online, normal port. For the first one found, use that for the new current address. Done.

2. If the current address is a secondary address and there is more than one secondary address then search the secondary address list for an online, normal port that is not the current address. For the first one found, use that for the new current address. Done.

Note that currently there is no failover from secondary back to primary address. This may be configured by enabling automatic failback. Failing over to a marginal port may not be possible during certain circumstances, such as if operation on a marginal port is preferable to no service. In other cases, it may be decided that no fail over is preferable. Optimization is also possible when multiple secondary port(s) are available, for example by examining the number of endpoints on each port, or looking at the current amount of activity on each port load balancing could be performed during failover.

While failover returns to a different address, failback is the operation of returning a failed-over endpoint to that endpoint's home system address. Depending upon administrative configuration this can happen automatically when a port has become online and is operating normally, or under manual control by an administrator. For automatic failback the failback delays for an administrator-defined interval before performing failback. This provides additional assurance that the restored port is operating correctly. Administrative (manual) failback is triggered by changing the in-use system address for an endpoint, or by successfully enabling an port and requesting failback of endpoints that have their home on the port and are currently failed over to another system address. In cases of administrative-requested failback no failback delay is applied. When a failback trigger occurs an endpoint failback event is queued for subsequent operation. For administrative failback the administrator may wait for completion of the operation.

Table 2 lists the three main ways for performing failback, and the operation characteristics of each.

TABLE 2

| EVENT | DELAY OR IMMEDIATE FAILOVER |
|---|---|
| Administrative failback of selected endpoints via scsitarget endpoint use | Finest control of failback; administrator controls location of each endpoint as primary or secondary port |
| Administrator enables a now functioning port and requests that any failed-over endpoints from that port failback to that port when it becomes available | Administrator controls when operation occurs; single step operation to recover system to normal operation |
| Automatic failback when system detects a port is operating normally after previous failover event | Hands-free operation of recovery from earlier failover. Has lowest level of control |

Endpoint failback is executed by an independent agent in scsitgtd. This allows it to gather the appropriate resources to change the configuration. Again, as noted above, because of time resources, notifications should be relatively lightweight.

The execution agent runs both periodically, and also on demand if an immediate failback event occurs. The agent is responsible for handling queued endpoint failback events and executing them. During failback execution each endpoint that meets the criteria for failback is migrated to its home system address. The following general algorithm is used for failback:

If endpoint
should failback
at this time
then
Find home system
address for the
endpoint If home
system address is
available
then
   Disassociate endpoint from
   current system address instance
   Associate endpoint with home system address instance
     Update group device entries for port bitmasks
end
if error
Leave endpoint unchanged else
   Update current endpoint configuration
end
Advise any waiters of execution completion.

Figure 5B:
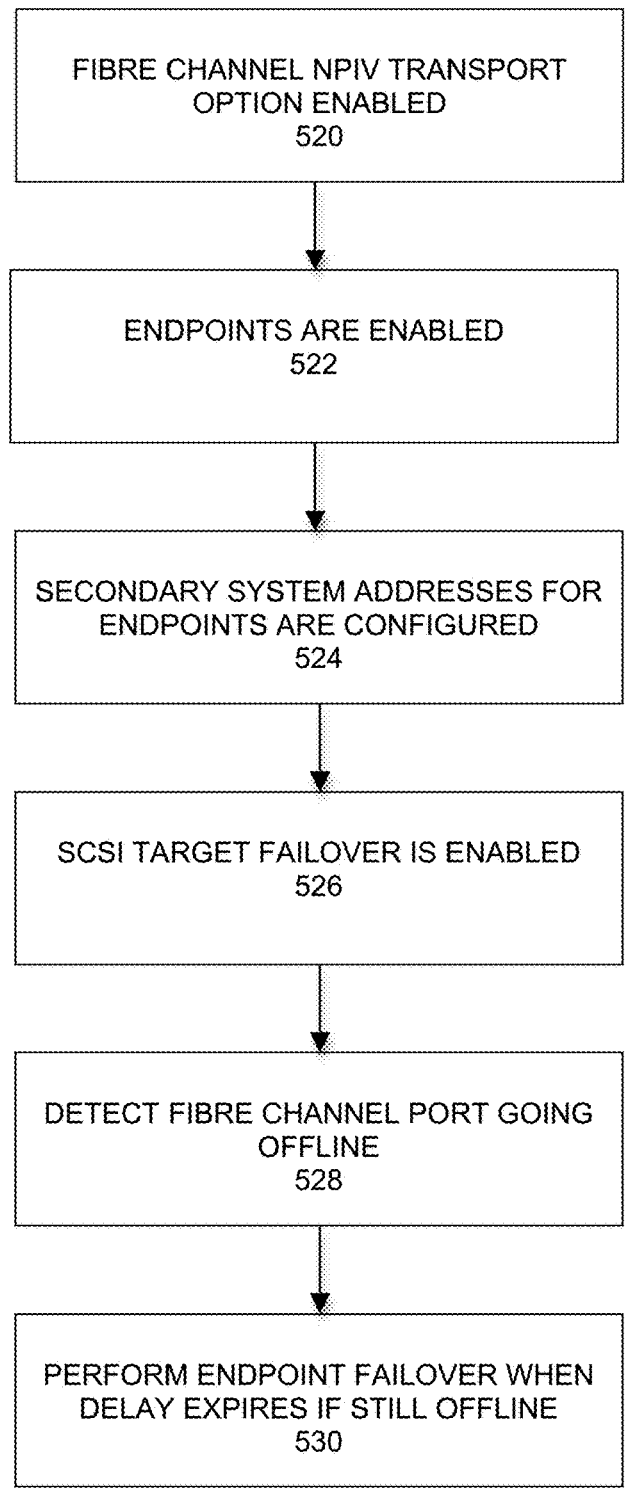
FIG. 5B is a flow chart that illustrates a method of performing port failover, under some embodiments.

FIG. 5B is a flow chart that illustrates a method of performing endpoint failover configuration and subsequent triggering of failover on a Fibre Channel port, under an embodiment. In block 520, the Fibre Channel NPIV transport option is enabled. This causes the Fibre Channel transport subsystem to be reconfigured to use NPIV and multiple endpoints per interface. Endpoints are enabled in block 522. This causes the endpoint subsystem to transition the endpoints to enabled/online, and passes the corresponding information to the transport layer to ensure the ports are also enabled and online. In block 524, the user (or system) configures secondary system-addresses for endpoints that will be used with endpoint failover. This updates the endpoint configuration, and the scsitgtd registry. In block 526, the user (or system) enables SCSI Target failover. The updates the endpoint failover monitor system to become ready to handle endpoint failover events. In the event that a Fibre Channel port goes offline, this is detected by FC-SSM which sends a notification to scsitgtd, block 528. This notification starts a delayed endpoint failover for endpoints associated with the interface. When the failover delay expires, if the interface is still offline then the failover executor performs endpoint failover, block 530. This updates the current system address for each applicable endpoint to a secondary system address, and then calls the scsitgtd transport layer to modify tpid properties of the transport port instance to use the new secondary address.

Updating Group Device Port Bitmasks

Devices are visible to specific host initiators, on specific Fibre Channel ports. In an embodiment, the mapping is managed in the kernel by SCST access groups. Each device in an access group has a port bitmask associated with it, providing the definition for which ports that device is visible on. The port bitmask includes NPIV virtual ports. Thus, when executing failover/failback or migrating an endpoint from one port to another in an NPIV environment it is necessary to update the port bitmask information in SCST. If there are many devices this may take a significant amount of time, which could adversely affect the overall failover/failback time. To address this a new kernel SCST port is added that allows batch updating of the port bitmasks for devices in groups.

API, Data Structure, and Registry Changes

In an embodiment, certain APIs may also be changed or added. One such API is the dd_scsitgtc_interface_show( ) API, which is added to show detailed interface information, similar to the existing dd_scsitgt_endpoint_show( ) API for endpoints. The dd_scsitgtc_interface_show_free( ) is used to free the allocated results of a show operation.

The scsitgtd transport API provides a port to the transport subsystem within scsitgtd. scsitgtd_transport_list_ports. The existing scsitgtd_transport_list_ports( ) API lists ports by name (i.e., system address). This API is modified to return the names of base ports. The scsitgtd_transport_list_port_ids lists all transports matching a given criteria.

The existing scsitgtd_transport_port_get_initiator_info API returns initiators visible on a given port by name (system address). This is no longer appropriate. This is replaced the API scsitgtd_transport_port_get_initiator_info_by_id which returns initiators visible on a given transport port instance. The existing scsitgtd_transport_port_name_resolve API looks up a transport port by one or more names (system address). It is modified to return the base port if a system address is given, or a port instance if a more specific name is given. The existing scsitgtd_transport_port_get_info API gets information for a port by system address. This is modified to return the information for the base port matching the system address, if any.

The existing scsitgtd_transport_option_set API sets transport option; it is modified to allow the new option npiv, to enable or disable NPIV support. The existing scsitgtd_transport_option_reset API resets transport options, and is modified to allow the new option npiv, to enable or disable NPIV support. The existing scsitgtd_transport_option_show API sets transport options, and is modified to show the new option npiv, showing whether NPIV support is enabled or not. The existing scsitgtd_transport_port_set_options API sets individual port options, and is modified so that port options that only apply to base port, e.g. port topology, can only be applied to base ports.

The scsitgtd_transport_port_instance_add API requests the transport subsystem to create a new port instance, and associate a port id with it. The scsitgtd_transport_port_instance_delete API requests the transport subsystem to delete an existing port instance. The existing scsitgtd_transport_show_stats API shows detailed statistics for a given list of endpoints, organized by endpoint. This is modified to return detailed statistics for a list for transport system addresses, with filtering by system address.

Under an embodiment, certain defined data structures are also modified, including: dd_scsitgtc data structures. The dd_scsitgtd_transport_stats_filter_t data structure is used to restrict transport statistics to selected transports and/or system addresses. It is similar to the existing endpoint-oriented dd_scsitgtd_stats_filter. The existing dd_scsitgtd_transport_stats_t data structure is used to return detailed transport port information. It is currently organized by endpoint, which is inappropriate. The dd_scsitgtc_interface_info_t data structure describes a single interface in detail. The existing dd_scsitgtd_endpoint_info_t data structure describes an endpoint, and is updated to reflect the separation between endpoint and port.

Certain scsitgtd RPC data structures are also updated. The scsitgtd_transport_stats_filter_t data structure is added to filter scsitgtd statistics requests. It is used for RPCs that return transport oriented detailed statistics. The existing scsitgtd_transport_stats_t data structure is used to return detailed transport port statistics. Currently this returns a scsitgtd_endpoint_stats_t array, which is inappropriate. The structure is changed as follows. The existing scsitgtd_transport_port_info_t structure describes a given port. This is modified to allow for multiple port instances:

```
typedef struct {
...
dd_bool_t base_port;      // TRUE if this is
a base port instance dd_uint32_t max_instances;
                          // Maximum number
of instances supported dd_uint32_t
current_instances         // Current number
of instances
scsitgtd_id_t instances[SCSITGTD_MAX_PORT_INSTANCES];
// Current instance ids
} scsitgtd_transport_port_info_t;
```

In an embodiment, certain registry structures are also modified. For example, the existing scsitgtd.transport registry namespace contains information about SCSI Target transports and associated configuration (e.g. transport options, ports, etc.) is modified. Likewise, the existing scsitgtd.endpoint registry namespace contains information about SCSI Target endpoints, and a new scsitgtd.option registry namespace that contains global scsitgtd options is added.

Although embodiments are described with respect to Fibre Channel systems, it should be noted that other transport protocols can also be adapted to use the virtualization methods described herein, including iSCSI and Fibre Channel over Ethernet (FCoE).

Embodiments may be applied to virtualizing SCSI transport endpoints to facilitate dynamic configuration of virtual ports and base ports in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment the network may be implemented to provide support for various storage architectures such as storage area network (SAN), Networkattached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of dynamically configuring Fibre Channel NPIV SCSI transport ports in a network, comprising:
   accessing a defined Fibre Channel network peripheral library (PLIB) microcontroller interface library;
   modifying a bitmask size of a port table definition of the PLIB from a first defined size to a greater customized size to support a number of SCSI targets and accommodate port indices to allow user space applications to utilize NPIV functionality in an operating system kernel for the NPIV SCSI transport ports and perform endpoint creation on demand by the user space applications;
   mapping a plurality of virtual ports to a single physical base port;
   receiving a request to reconfigure the Fibre Channel NPIV SCSI transport ports;
   during runtime of data storage operations, dynamically reconfiguring the plurality of virtual ports from a first mapping to a second mapping by assigning the virtual ports to a different physical base port in accordance with a defined port bitmask to perform a data transfer operation within a storage system;
   enabling an NPIV mode for the different physical base port upon the reconfiguring; and
   configuring the different physical base port using an endpoint address that identifies each port with a transport port ID (tpid) and a respective system address, online status, and transport-specific set of properties.

2. The method of claim 1 wherein the wherein the PLIB comprises a simple access library providing a low-level interface to peripherals in the SCSI network to allow user space applications to utilize N-port ID virtualization (NPIV) functionality in an operating system kernel, and further wherein the port table contains both physical ports and virtual ports with a unique index across the physical base ports and virtual ports, and further wherein the number of physical base ports is static and the number of virtual ports is dynamic.

3. The method of claim 2 wherein the reconfiguring is performed concurrently with other backup operations executed in the network, and in a manner that does not disrupt the other backup operations, and wherein the port table is configured to have a port bitmask of size 256 bits.

4. The method of claim 3 wherein the data transfer operation is performed between one of: two transport ports in a device of the storage system, or two storage subsystems each containing one or more storage devices of the storage system.

5. The method of claim 2 wherein the data transfer operation comprises one of: data migration among devices in the storage system, and recovery from a failure condition in the network, and further comprises moving virtual port endpoints from a first physical base port to a second physical base port.

6. The method of claim 1 wherein the virtual ports represent endpoints that are abstracted objects having attributes that can be moved around a network utilizing the transport ports.

7. The method of claim 6 further comprising managing the endpoints through a multi-threaded SCSI target daemon process that sends commands to an operating system of the network to create and maintain multiple virtual ports for the physical base port based on at least some of the endpoints.

8. The method of claim 7 wherein the network system comprises a Fibre Channel system implementing the SCSI transport ports, and wherein the attributes for physical base ports include firmware version, physical presence, and link speed; and further wherein the attributes for virtual ports include host initiator identifiers; WWPN addresses, WWNN addresses and fcp2-retry state.

9. The method of claim 8 wherein the operating system comprises a data domain deduplication operating system, and wherein the network comprises a storage area network.

10. The method of claim 9 wherein the mapping comprises an N_Port ID (NPIV) mapping for the Fibre Channel system.

11. A method of dynamically configuring virtual Fibre Channel NPIV SCSI transport ports in a network, comprising:
   accessing a defined Fibre Channel network peripheral library (PLIB) microcontroller interface library;
   modifying a bitmask size of a port table definition of the PLIB from a first defined size to a greater customized size to support a number of SCSI targets and accommodate port indices to allow user space applications to utilize NPIV functionality in an operating system kernel for the NPIV SCSI transport ports and perform endpoint creation on demand by the user space applications;

maintaining a port table that contains a plurality of physical base ports and plurality of virtual ports, wherein each physical base port and each virtual port has a unique port index;

associating the physical base ports and virtual ports of the port table with a physical base port of a networked device through a mapping process to define a first virtual port map; and upon receiving a reconfiguration request and during runtime of data storage operations, dynamically reconfiguring the physical base ports and virtual ports to a second virtual port map through the mapping process by assigning the virtual ports to a different physical base port in accordance with the port table;

enabling an NPIV mode for the different physical base port upon the reconfiguring; and configuring the different physical base port using an endpoint address that identifies each port with a transport port ID (tpid) and a respective system address, online status, and transport-specific set of properties.

12. The method of claim 11 wherein the PLIB comprises a simple access library providing a low-level interface to peripherals in the SCSI network to allow user space applications to utilize N-port ID virtualization (NPIV) functionality in an operating system kernel, and further wherein the port table contains both physical base ports and virtual ports with a unique index across the physical base ports and virtual ports, and further wherein the number of physical base ports is static and the number of virtual ports is dynamic, and further wherein the reconfiguration request is generated by one of a configuration change request or a failure condition response, and wherein the transport-specific set of properties comprise a link speed and firmware version for the ports.

13. The method of claim 12 wherein the physical base ports and virtual ports are represented as endpoints comprising abstracted objects having attributes that are portable through a network including the networked device, the attributes specifying addressing and operating characteristics of an associated endpoint.

14. The method of claim 13 wherein the port table is defined within a peripheral library maintained by an operating system of the network and has a size of 256 bits by the modifying step.

15. T method of m 14 wherein the data transfer operation is performed between one of: two transport ports in a device of the storage system, and two storage subsystems each containing one or more storage devices of the storage system.

16. The method of claim 14 wherein the data transfer operation comprises moving virtual port endpoints from a first physical base port to a second physical base port.

17. The method of claim 14 wherein instances of a physical base port or virtual port can be created or deleted or modified by defining associated endpoints, and wherein the endpoints are persistently associated with the physical base port until an endpoint is updated or deleted.

18. The method of claim 17 wherein the network comprises a Fibre Channel system implementing the SCSI transport ports, and wherein the data store is maintained by a server computer executing a data domain deduplication operating system, and wherein the network comprises a storage area network, and wherein the base port comprises one of a host bus adapter or a storage device port.

19. The method of claim 11 wherein the mapping process and reconfiguring step are performed concurrently with other backup operations executed in the network, and in a manner that does not disrupt the other backup operations.

20. A computer program product comprising a non-transitory computer usable medium having machine readable code embodied therein for dynamically configuring Fibre Channel NPIV SCSI transport ports in a network, comprising by:

accessing a defined Fibre Channel network peripheral library (PLIB) microcontroller interface library;

modifying a bitmask size of a port table definition of the PLIB from a first defined size to a greater customized size to support a number of SCSI targets and accommodate port indices to allow user space applications to utilize NPIV functionality in an operating system kernel for the NPIV SCSI transport ports and perform endpoint creation on demand by the user space applications;

mapping a plurality of virtual ports to a single physical base port;

receiving a request to reconfigure the Fibre Channel NPIV SCSI transport ports; and during runtime of data storage operations, dynamically reconfiguring the plurality of virtual ports from a first mapping to a second mapping by assigning the virtual ports to a different physical base port in accordance with a defined port bitmask to perform a data transfer operation within a storage system;

enabling an NPIV mode for the different physical base port upon the reconfiguring; and configuring the different physical base port using an endpoint address that identifies each port with a transport port ID (tpid) and a respective system address, online status, and transport-specific set of properties, and wherein the transport-specific set of properties comprise a link speed and firmware version for the ports.

* * * * *